United States Patent [19]

Perkins et al.

[11] 3,735,161

[45] May 22, 1973

[54] PIEZOELECTRIC TRANSDUCER

[75] Inventors: George D. Perkins, Glendora, Calif.; John R. Colbert, Champaign, Ill.

[73] Assignee: Bell & Howell Company, Pasadena, Calif.

[22] Filed: Dec. 23, 1971

[21] Appl. No.: 211,200

[52] U.S. Cl. ....................................310/9.5, 310/8.4

[51] Int. Cl. ............................................H01v 7/02

[58] Field of Search............................310/8, 9.5, 8.4; 352/62.9

[56] References Cited

UNITED STATES PATENTS

| | | | |
|---|---|---|---|
| 3,591,813 | 6/1971 | Coquin et al. | 310/9.5 |
| 3,528,765 | 9/1970 | Fay et al. | 252/62.9 |

OTHER PUBLICATIONS

Ultrasonic Transducer Materials, by Mattiat, Plenum Press, 1971, pp. 97, 136 and 148–151.

*Primary Examiner*—J. D. Miller
*Assistant Examiner*—Mark O. Budd
*Attorney*—Robert Berliner

[57] ABSTRACT

A lithium niobate piezoelectric single crystal transducer having selected rotational orientations with respect to X, Y and Z rectangular coordinate axes. Compressional mode accelerometers having low or zero shear and torsion sensitivity are provided in which the crystal is oriented, in IRE notation, as (a) a (*yxl*) +38.6° cut or symmetrical equivalents thereof, such as (*zxl*) (b) a +60°/+51.4° cut. Shear mode accelerometers having low or zero compression sensitivity are provided in which the crystal is oriented, in IRE notation, as (a) (*xyl*) +31.7° cut, or symmetrical equivalents, and (b) an (*xyl*) +76.7° cut.

16 Claims, 6 Drawing Figures

INVENTORS,
GEORGE D. PERKINS
JOHN R. COLBERT
BY
NILSSON, ROBBINS, WILLS & BERLINER.
ATTORNEYS.

PIEZOELECTRIC TRANSDUCER

FIELD OF THE INVENTION

The fields of art to which the invention pertains include the fields of piezoelectric crystals and accelerometers and other transducers incorporating piezoelectric crystals.

BACKGROUND AND SUMMARY OF THE INVENTION

Single crystal lithium niobate ($LiNbO_3$) is a clear, colorless material having a reported melting point of 1,250°C and a ferroelectric Curie point of 1,210°C. It crystalizes in the trigonal system (3m) and single domain crystals of practical size can be grown by the Czochralski technique. The material has a high piezoelectric coupling coefficient, i.e., high electrical energy output to mechanical energy input, and vice-versa. These characteristics make single crystal lithium niobate useful in a variety of transducers in which the piezoelectric effect is important, such as in frequency determining elements, temperature measurement devices, and in accelerometers and other transducers utilizing mechanical force to generate a signal current. Some of the properties of lithium niobate have been discussed in the literature; see for example "Lithium Niobate: A High-Temperature Piezoelectric Transducer Material" by Fraser and Warner, Journal of Applied Physics, Vol. 37, No. 10, September 1966, pages 3853–3854, "Determination of Elastic and Piezoelectric Constants for Crystals In Class (3m)" by Warner, Onoe and Coquin, Journal of the Acoustical Society of America, Vol. 42, No. 6, 1967, pages 1223–1231, and "Piezoelectric and Elastic Properties of Lithium Niobate Single Crystals" by Yamada, Niizeki and Toyoda,"Japanese Journal of Applied Physics," Vol. 6, No. 2, February 1967, pages 151–155.

When utilizing such crystals for their piezoelectric effect, it is generally desired to measure sensitivity in only a single direction. This is particularly true with accelerometers used in measuring accelerations encountered in vibrations occurring in aircraft, missiles, and the like. However, piezoelectric crystals generally exhibit cross-axis sensitivity so that the signal resulting from the application of mechanical force does not accurately represent the amount of force exerted in a particular direction. As a result of this lack of unidirectional response, accelerometers are designed so that the mass exerting the force is constrained to apply force only along one measuring axis in relation to the crystal. A variety of mounting arrangements have been devised utilizing spring loading and the like in an attempt to reduce cross axis sensitivity. For example, in Tolliver et al. U.S. Pat. No. 3,233,465 an accelerometer is illustrated utilizing a piezoelectric crystal in a compressional mode of operation and the effect of cross axis forces are minimized by spring loading the inertial member against the crystal. In Shoor U.S. Pat. No. 3,104,335, an accelerometer is disclosed in which the piezoelectric crystal is mounted in shear relationship between the housing and the inertial member, and the device is designed to minimize cross-axis sensitivity by the provision of stress relief gaps. Other patents which disclose some form of compensation for unwanted crystal sensitivity include U.S. Pat. Nos. 3,060,333, 3,075,098, 3,075,099, 3,307,054, 3,349,259, 3,351,787 and 3,429,031. Other patents of interest herein with respect to piezoelectric crystal materials are U.S. Pat. nos. 2,598,707, 2,714,672, 2,808,524, 2,864,713, 2,947,698, 2,976,246 and 3,471,721.

In accordance with the present invention, piezoelectric crystals are provided having low or zero cross axis sensitivity. In particular, lithium niobate single crystals are provided which have been cut from a larger crystal with certain selected orientations. For purposes of uniform reference in cutting the crystals, a Z axis has been chosen to coincide with the C (symmetry) axis of the crystal, an X axis has been chosen to lie in an a axis (mirror plane - perpendicular to the plane of symmetry) of the crystal and a Y axis has been chosen to lie perpendicular to the Z and X axes to give a conventional right handed rectangular coordinate system. For IRE notation, where the thickness dimension is along the Z axis, the X axis has been arbitrarily chosen as the length dimension; in all other cases, the Z axis has been arbitrarily chosen as the width dimension. Referring to such rectangular coordinate axes, in one form of the invention, lithium niobate single crystals are provided which can be utilized in a compressional mode transducer by orientating a crystal cut from a larger crystal along a plane (a) initially perpendicular to the Y axis and rotated 38.6 ±1° counterclockwise around the X axis, in IRE notation an (*yxl*) +38.6°(±1°) cut. In another form of the invention, lithium niobate single crystals can be provided for utilization in a shear mode transducer by orientating a crystal cut along a plane (a) initially perpendicular to the X axis and rotated about 31.7° +1° counterclockwise around the Y axis, in IRE notation a (*zxtl*) + 60°(±1°)/ + 51.4°(±1°) cut or (b) initially perpendicular to the X axis and rotated 76.7° ±1° counterclockwise around the Y axis, in IRE notation an (*xyl*) + 76.7°(±1°) cut or symmetrical equivalents thereof. A symmetrical equivalent of the 38.6° Y cut is obtained by cutting from a crystal along a plane initially perpendicular to the Z axis, rotated 60.0° ±1° counterclockwise around the Z axis to define an X' axis thereat and then rotated 51.4 ±1° counterclockwise around the X' axis.

DETAILED DESCRIPTION

Figure 1:
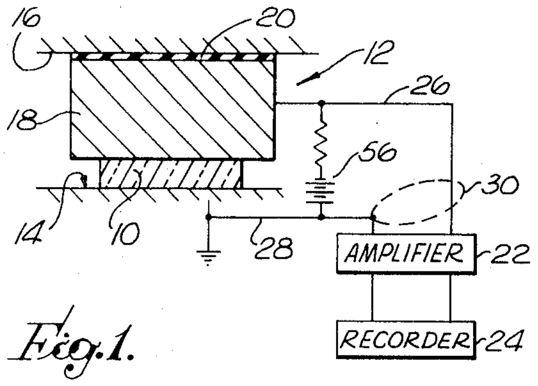
FIG. 1 is a schematic representation of components of an accelerometer utilizing a piezoelectric crystal in a compressional mode of operation.

As required, details of illustrative embodiments of the invention are disclosed. However, it is to be understood that these embodiments merely exemplify the invention which may take forms different from the specific illustrative embodiments disclosed. Therefore, specific structural and functional details are not necessarily to be interpreted as limiting, but as a basis for the claims. In this regard, the illustrated embodiments herein comprise accelerometers, but it is to be emphasized that the crystals illustrated can be utilized in other transducers, including frequency determining elements, temperature measurement devices and the like, where the piezoelectric effect is useful. Furthermore, while rotational angles are defined with respect to a particular rectangular coordinate system, the symmetrical equivalents of the orientation are of course, also included. The rotational angles depicted in the drawings are precision cuts which illustrate the broader useful ranges.

Referring to FIG. 1, in one form of the invention a wafer 10 cut from a crystal of lithium niobate is utilized in a compressional mode in an accelerometer 12. The accelerometer includes a housing having a bottom wall 14 and a top wall 16 between which are sandwiched the crystal 10 and an inertial mass 18 in contact with the crystal 10. The inertial mass is connected to the top wall 16 by means of a layer 20 of non-conductive adhesive.

The inertial mass 18 and bottom wall 14 are electrically connected to reproducing means, represented by an amplifier 22 and a recorder 24, via leads 26 and 28, respectively, through a coaxial cable indicated by the dashed lines 30. Constructional details of such an accelerometer are well known to the art (see for example, U.S. Pat. No. 3,233,465, above-referred to) and are not a part of the present invention.

In accordance with one aspect of the invention, by cutting the wafer 10 from a larger crystal of lithium niobate so that the cut crystal has certain specific orientations, the crystal has low or zero cross axis sensitivity when utilized in such a compressional mode. Accordingly, one need not resort to the various prior art devices of spring loading the crystal or taking other steps to decrease cross axis sensitivity.

Figure 2:
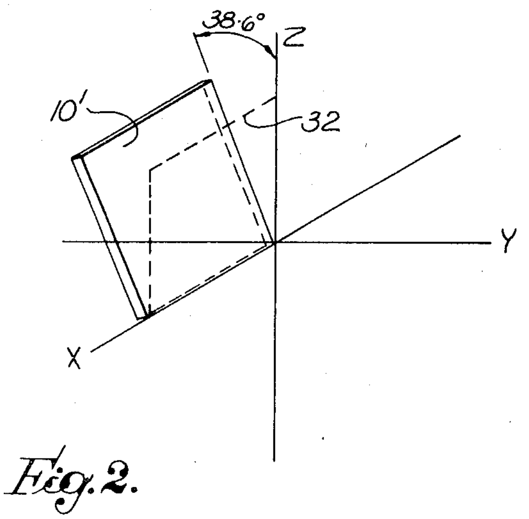
FIG. 2 is a schematic representation of a crystal section, having a (*yxl*) +38.6° cut.

Referring to FIG. 2, the orientation of one such wafer 10' is schematically represented in relation to the direction of the crystal, in terms of rectangular coordinate axes derived as hereinabove stated. In particular, the crystal is cut along a plane initially perpendicular to the Y axis and rotated about 38.6° counterclockwise around the X axis to yield a (*yxl*) + 38.6° cut in IRE notation. For purposes of illustration a plane perpendicular to the Y axis (also referred to as a "Y-cut") is shown by the dashed lines 32. To obtain the cut, the boule from which the wafer 10' is sliced is mounted on a conventional orientation jig and carefully adjusted using any conventional prior art technique. The method of obtaining the cut, other than the selection of the angle, is not a part of the present invention. Orientation of the crystal following the cut is confirmed by Laue X-ray photography.

Crystals cut as in FIG. 2 were connected by shielded leads to an Admittance Bridge driven by two sources of radio frequency. One source was an oscillator with a range of 50 kc to 55 mc, while the other was a swept frequency oscillator with a total range of from 0 to 222 mc. This latter oscillator had both variable sweep range and variable sweep rate and it was used to obtain approximate values of the crystal frequency responses. Exact values were then measured by the 50 kc-55 mc oscillator which was monitored by a 60 mc frequency counter. The bridge output was then amplified and displayed on an oscilloscope. Measurements were made in a heavy duty electric clam shell type oven with a range to 1,850°F. The temperature of the oven was controlled and temperatures were measured electrically. Fundamental vibration frequencies were measured along with as many overtone frequencies as were of sufficient amplitude to be accurately identified. Multiple frequency measurement was made at from 12 to 14 different temperatures and results were then converted to a polynominal expression for frequency vs. temperature by a Fortran computer program. Each of the boules from which crystals were cut were analyzed by mass spectrography and the impurity concentration on all samples was small enough to indicate that the particular constants involved, which are essentially macroscopic, would not be affected thereby.

Utilizing a (*yxl*) + 38.6° cut, and applying tensor analysis to the data obtained as above described, it was found that a wafer 10' can be formed having a compression or tension sensitivity of 37 picocoulombs per newton and substantially zero shear and torsion sensitivity.

Figure 3:
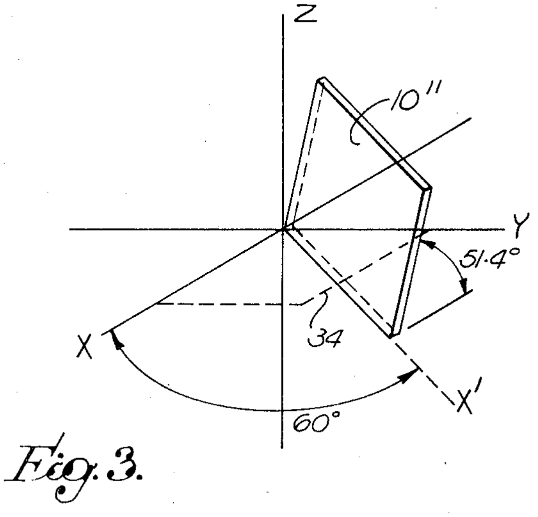
FIG. 3 is a schematic representation of a crystal section having a (*zxtl*) + 60°/+ 51.4° cut a symmetrical equivalent to the section of FIG. 2.

Referring to FIG. 3, the orientation of another wafer 10'' is schematically represented in relation to the direction of the crystal in terms of rectangular coordinate axes. In this illustration, the crystal is cut along a plane 34 initially perpendicular to the Z axis, rotated about 60° counterclockwise around the Z axis to define an X' axis 36 thereat and then rotated about 51.4° counter clockwise around the X' axis to yield a (*zxtl*) + 60°/+ 51.4° cut in IRE notation. The resulting orientation is a symmetrical equivalent, in mirror image fashion, of the above (*yxl*) + 38.6° cut. Tensor analysis confirms this equivalency, showing a compression or tension sensitivity also of 37 picocoulombs per newton and zero shear and torsion sensitivity.

Figure 4:
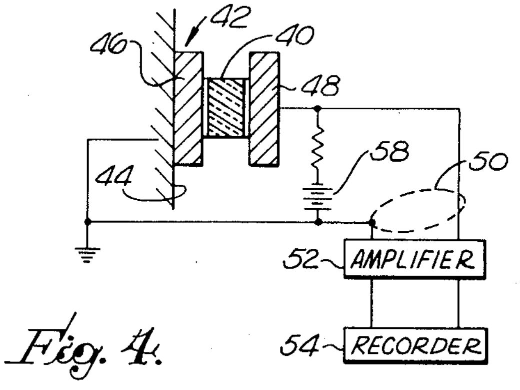
FIG. 4 is a schematic representation of components of an accelerometer utilizing a piezoelectric crystal in a shear mode of operation.

Referring to FIG. 4, in another form of the invention, a wafer 40 is cut from a crystal of lithium niobate is utilized in a shear mode in an accelerometer 42. The accelerometer 42 includes a housing having a side wall 44 and inertial masses 46 and 48 sandwiching the crystal 40 therebetween. The crystal 40 is secured by conductive adhesive to the inertial masses 46 and 48 which are electrically connected through a coaxial cable 50 to an amplifier 52 and recorder 54. By such means, the wafer 40 is subjected to a shear or torsional forces to generate a signal current. Construction details of such an accelerometer are well known to the art (see for example, U.S. Pat. No. 3,104,335, above-referred to) and are not a part of the present invention.

Figure 5:
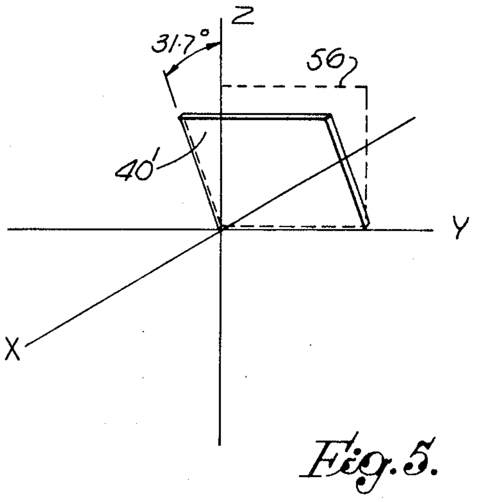
FIG. 5 is a schematic representation of a crystal section having an (*xyl*) + 31.7° cut.

Referring to FIG. 5, the orientation of a wafer 40' for use in a shear mode accelerometer is schematically represented in relation to the direction of the crystal in terms of rectangular coordinate axes, derived as hereinabove stated. In particular, the crystal is cut along a plane 56 initially perpendicular to the X axis and rotated 31.7° counterclockwise around the Y axis to yield an (*xyl*) + 31.7° cut in IRE notation. The orientation has a predicted shear sensitivity of 67 picocoulombs per newton and zero compression sensitivity. When a crystal was cut at that orientation from a larger crystal of lithium niobate, it had a measured shear sensitivity of 66 picocoulombs per newton and a measured cross axis sensitivity of only 1.2 percent.

Figure 6:
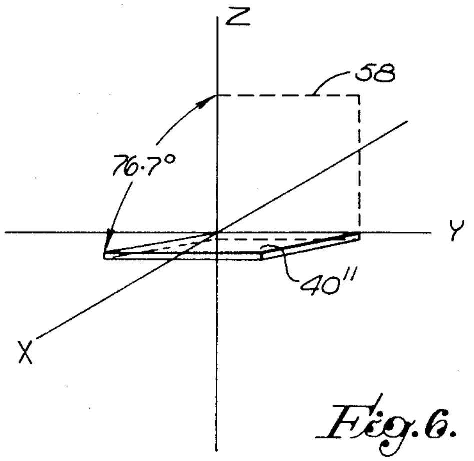
FIG. 6 is a schematic representation of a crystal section having an (*xyl*) + 76.7° cut.

Referring to FIG. 6, a crystal wafer 40'' is illustrated which is cut along a plane 58 initially perpendicular to the X axis and rotated about 76.7° counterclockwise around the Y axis to yield an (*xyl*) + 76.7° cut in IRE notation. Tensor analysis indicates that such an X-cut has a shear sensitivity of 79.9 picocoulombs per newton and zero compression sensitivity.

Variations of about ±1° in each of the foregoing orientations are permitted to yield shear and compression sensitivity ranges of up to about ±5 percent.

As above-indicated, the output of a piezoelectric crystal is a function of the applied stress. The proportionally constant between stress and output increases with temperature which results in an impairment of accuracy in a transducer which is subjected to constant stress in a changing temperature environment. In order to minimize the effect of temperature on charge displacement, advantage is taken of another property of the lithium niobate crystal, that is the production of a charge displacement when the crystal is impressed with an electric field. The proportionality constant between electric field and output is the dielectric constant which is also temperature sensitive. The equation relating these parameters is:

$$D = TdT_d + EKT_K$$

where $D$ is charge displacement, $T$ is applied mechanical stress, $d$ is the piezoelectric constant, $T_d$ is the temperature coefficient of $d$, $E$ is the electric field strength, $K$ is the dielectric constant and $T_K$ is the temperature coefficient of the dielectric constant. Measured values of $T_d$ and $T_K$ indicate that they are of the same order of magnitude. Therefore, in order to maintain a stable charge displacement measurement $D$ with change in temperature for a constant stress, the following equation applies:

$$dT_d + EKT_K = \text{zero}$$

Thus, a constant negative field applied across the crystal when all other parameters are positive produces the desired effect of constant charge displacement over a wide temperature range. Only low voltages are required. Referring to FIGS. 1 and 4, such a low voltage negative field is indicated by batteries 56 and 58 applied across the crystals 10 and 40 respectively. Such a modification to the accelerometer designs greatly increases their high temperature accuracy.

We claim:

1. In a piezoelectric device including at least one transducer element comprising a piezoelectric crystal, the improvement according to which said piezoelectric crystal is cut from a larger crystal of lithium niobate, said cut crystal having a crystal orientation selected from the following:

(*yxl*) + 38.6°(±1°), (*zxtl*) + 60°(±1°)/ + 51.4° (±1°), (*xyl*) + 31.7(±1°), (*xyl*) + 76.7°(±1°), or a symmetrical equivalent thereof.

2. The improvement according to claim 1 in which said cut crystal, has a (*xyl*) + 38.6°(±1°) orientation or a symmetrical equivalent thereof.

3. The improvement according to claim 1 in which said cut crystal, has an (*xyl*) + 31.7° (±1°) orientation or a symmetrical equivalent thereof.

4. The improvement according to claim 1 in which said cut crystal, has an (*xyl*) + 76.7° (±1°) orientation or a symmetrical equivalent thereof.

5. The invention according to claim 1 in which said cut crystal, has a (*zxtl*) + 60°(±1°)/+ 51.4°(±1°)orientation or a symmetrical equivalent thereof.

6. In an accelerometer wherein a piezoelectric crystal is operatively associated in a compressional relationship with an inertial member, the improvement according to which said piezoelectric crystal is cut from a larger crystal of lithium niobate, said cut crystal, having a crystal orientation selected from the following:

(*yzl*) + 38.6°(±1°) and (*zxtl*) + 60°(±1°)/ + 51.4°(±1°), or a symmetrical equivalent thereof.

7. The improvement according to claim 6 in which said cut crystal, has a (*yzl*) + 38.6°(±1°) orientation or a symmetrical equivalent thereof.

8. The improvement according to claim 6 in which said cut crystal, has a (*zxtl*) + 60°(±1°)/ + 51.4°(±1°) orientation or a symmetrical equivalent thereof.

9. In a piezoelectric accelerometer wherein a piezoelectric crystal is operatively associated in a shear relationship with an inertial member, the improvement according to which said piezoelectric crystal is cut from a larger crystal of lithium niobate, said cut crystal having a crystal orientation selected from the following:

(*xyl*)+31.7°(±1°) and (*xyl*)+76.7°(±1°) or a symmetrical equivalent thereof.

10. The improvement according to claim 9 in which said cut crystal, has an (*xyl*) + 31.7°(±1°) orientation or a symmetrical equivalent thereof.

11. The improvement according to claim 9 in which said cut crystal, has an (*xyl*) + 76.7°(±1°) orientation or a symmetrical equivalent thereof.

12. A single crystal plate of lithium niobate having a crystal orientation selected from the following: (*yxl*) + 38.6° (±1°), (*zxtl*) + 60°(±1°)/ + 51.4° (±1°), (*xyl*) 31.7°(±1°) and (*xyl*) + 76.7°(±1°).

13. The single crystal plate of claim 12 having a (*xyl*) + 38.6°(±1°) orientation.

14. The single crystal plate of claim 12 having a (*zxtl*) + 60°(±1°)/ + 51.4°(±1°) orientation.

15. The single crystal plate of claim 12 having an (*xyl*) + 31.7°(±1°) orientation.

16. The single crystal plate of claim 12 having an (*xyl*) + 76.7°(±1°) orientation.

* * * * *

Notice of Adverse Decision in Interference

In Interference No. 98,973, involving Patent No. 3,735,161, G. D. Perkins and J. R. Colbert, PIEZOELECTRIC TRANSDUCER, final judgment adverse to the patentees was rendered Jan. 27, 1977, as to claims 2, 5–8, 13 and 14.

[*Official Gazette July 5, 1977.*]